US006817851B2

(12) United States Patent
Brüssel

(10) Patent No.: US 6,817,851 B2
(45) Date of Patent: *Nov. 16, 2004

(54) METHOD AND APPARATUS FOR THE MANUFACTURE OF FIBER-REINFORCED PLASTIC COMPOSITIONS

(75) Inventor: Richard Brüssel, Sulzfeld (DE)

(73) Assignee: Dieffenbacher GmbH + Co. KG, Eppingen (DE)

( * ) Notice: Subject to any disclaimer, the term of this patent is extended or adjusted under 35 U.S.C. 154(b) by 58 days.

This patent is subject to a terminal disclaimer.

(21) Appl. No.: 09/997,246

(22) Filed: Nov. 30, 2001

(65) Prior Publication Data

US 2002/0098287 A1 Jul. 25, 2002

(30) Foreign Application Priority Data

Nov. 30, 2000 (DE) .......................................... 100 59 461

(51) Int. Cl.$^7$ ............................................... B29C 47/60
(52) U.S. Cl. ..................... 425/114; 425/204; 425/208; 118/125; 118/424; 118/427; 366/76.1; 366/76.5; 366/81
(58) Field of Search ................................ 425/113, 114, 425/204, 200, 208, 378.1, 381.2, 382.3, 308; 118/424, 427, 125; 366/81, 76.1, 76.5

(56) References Cited

U.S. PATENT DOCUMENTS 4,875,847 A * 10/1989 Wenger et al. ............... 425/204
5,110,275 A    5/1992 Scheuring ..................... 425/113
5,653,534 A    8/1997 Matsumoto et al. ......... 366/76.1
5,879,602 A    3/1999 Scheuring ..................... 264/136
6,106,266 A *  8/2000 Ruger ........................... 425/204
6,238,733 B1   5/2001 Therolf ......................... 427/209

FOREIGN PATENT DOCUMENTS

| DE | 23 51 328 A1 | 4/1975 |
| DE | 198 36 787 A1 | 2/2000 |
| DE | 199 59 525 A1 | 6/2001 |
| EP | 0 960 715 A2 | 12/1999 |
| FR | 15 30 229 | 5/1968 |

OTHER PUBLICATIONS

Patent Abstracts of Japan, JP 57 126639 A (Toyoda Gosel KK), Aug. 6, 1982.

* cited by examiner

Primary Examiner—Robert Davis
Assistant Examiner—Joseph S Del Sole
(74) Attorney, Agent, or Firm—Foley & Lardner LLP

(57) ABSTRACT

An apparatus for the manufacture of fiber-reinforced plastic compositions. The apparatus addresses the disadvantages of previous methods and apparatuses for the manufacture of fiber-reinforced plastic compositions using a plasticizing extruder. Some embodiments of the apparatus may increase and/or better define the fiber content in the plasticate, as well as improve performance in the production of plasticates from fiber fleeces and fiber mats. Embodiments include an apparatus with a plasticizing extruder with adapted geometry of the extruder casing and the corresponding screw elements.

21 Claims, 5 Drawing Sheets

METHOD AND APPARATUS FOR THE MANUFACTURE OF FIBER-REINFORCED PLASTIC COMPOSITIONS

BACKGROUND OF THE INVENTION

1. Field of the Invention

The invention relates to a method for the manufacture of fiber-reinforced plastic compositions. It furthermore relates to an apparatus for the practice of the method.

2. Related Art

A method and an apparatus for the manufacture of fiber-reinforced plastic compositions using a plasticizing extruder is disclosed in U.S. Pat. No. 6,238,733 (claiming priority to DE 198 36 787 A1), which is incorporated herein by reference in its entirety. The method and the plasticizing extruder described therein have proven practical. However, there is still room for improvement for special fiber strands and fiber materials, especially in the manufacture of fiber-reinforced plastic compositions (plasticates) from fiber fleeces or fiber mats and a fluid plastic film. In order to achieve the same effect as with the method of DE 198 36 787 A1, various methods have been used in the past. For example, natural fibers have been fused from semi-finished products (pellets), e.g., as rodlet granules, or these fibers have been fed through a fiber stuffing unit into the impregnating apparatus. This results in a very poor quality of impregnation. Fiber fleeces can also be shot through with thermoplastic fibers and pressed in the shaping process. The disadvantages in the known methods and in the use of semi-finished products are the high cost and the additional waste in the transformation process.

In regards to the fusing of fiber rodlets, mention must be made of low fusion performance in the case of gentle fusion, and the great harm done to the fibers and the poor fiber impregnation obtained when operating with fiber plugging units.

SUMMARY OF THE INVENTION

The invention is addressed to the problem of offering a method whereby the disadvantages discussed above can be avoided, and especially to increasing and better defining the fiber content in the plasticate, as well as improving performance in the production of plasticates from fiber fleeces and fiber mats. A further object of the invention is the creation of an apparatus with a plasticizing extruder for the practice of the method, with an adapted geometry of the extruder casing and of the corresponding screw elements.

With the method and the apparatus with a plasticizing extruder according to the present invention, a number of advantages and improvements are achieved. For example, a higher and more precisely defined fiber content can be achieved in the end product as well as good impregnation of all fibers. Another example is that a higher throughput is achieved, which allows for a very great increase in output in the creation of the plasticates. Another example is that without producing semi-finished products, the impregnation and production of the plasticate can be performed by a direct method That is, directly from raw bales with a fleece producing machine, where the fiber fleeces do not need to satisfy stringent requirements. Yet another example is that with the plasticate technology according to the invention, continuous pressing is possible, allowing ribs and nubs to be formed in the product.

It should also be mentioned that yet another advantage of the invention is that the weight per unit area or weight per meter of the fiber fleece or mats and/or of the combination is continuously determined before entry into the extruder. Also, the weight of the fiber in the plasticate and the plasticate weight are kept within close tolerances. Additional advantages are that the fiber fleece and/or fiber mats in band form, presented in coils or rolls, can be fed to the extruder, and by a manual or automatic change of coils or rolls they can be joined together to form an endless fiber fleece or fiber mat for delivery into the extruder, or the fiber fleece can be formed directly on a conveyor belt by spreading the fibers onto it and can be fed to the extruder. Also, the fiber fleece and/or the fiber mat can be dried directly within the line before the line is drawn into the extruder. Finally, there is also the possibility of drying the fiber fleece before it is drawn into the extruder, and the fiber fleece or fiber mat web can serve additionally as a conveyor belt for sprinkling with staple fibers, long-fiber granules, granules, recyclate chips or fillers.

The solution of this problem as to the method is to be seen in connection with three embodiments, as follows: In the first embodiment the problem is solved by the fact that endless fiber fleeces or fiber mats made of natural, chemical, vitreous, mineral, carbon, chopped or metal fibers and possible combinations thereof, in the form of a continuous web of the approximate width b equal to the length of the feed slot, are fed with the fluid plastic through a slot-like inlet in the plasticizing extruder, and that the fiber fleeces or fiber mats are introduced with a wrap-around in the enlarged area of the screw cylinder into the grooves and onto the lands of the feed shaft.

In the second embodiment, by the fact that endless fiber fleeces or fiber mats made of natural, chemical, vitreous, mineral, carbon, chopped or metal fibers and possible combinations thereof, in the form of a continuous web of the approximate width b equal to the length of the feed slot, are fed with the fluid plastic through a slot-like inlet in the plasticizing extruder, and that the fiber fleeces or fiber mats are introduced with a wrap-around in the enlarged area of the screw cylinder into the grooves and onto the lands of the feed shaft are forced by strippers into the grooves and onto the lands of the feed shaft, and in the third embodiment, in that endless fiber fleeces or fiber mats made of natural, chemical, vitreous, mineral, carbon, chopped or metal fibers and possible combinations thereof, in the form of a continuous web of the approximate width b equal to the length of the feed slot, are fed with the fluid plastic through a feed slot into the plasticizing extruder, and that the fiber fleeces or fiber mats are introduced after a wrap-around in the enlarged area of the screw cylinder into the grooves and onto the lands of the feed shaft and tandem shaft.

For the drawing-in of fiber fleeces and/or fiber mats it is generally advantageous that the casing likewise increases in diameter in the area of the second screw shaft. The diameter enlargement in the feed area continues downstream to a greater or lesser extent into the closed area, depending on the fiber structure and impregnation ratio. Particularly if the fleeces and/or mats in band form are of great tensile strength, the impregnating process is improved by operating without strippers, because the molten plastic band/plastic films are fed in in the feed area and compressed by the fiber band. If the fleece and/or mats are of low tensile strength, however, it is advantageous to operate with a stripper on the feed shaft and to provide for a diameter enlargement in the feed casing for both screw shafts, while the diameter increase in the area of the second shaft can be less and can be disposed eccentrically, especially in the case of the feed shaft. That means that to prevent material build-up onto the lands of the feed shaft due to the increase of the diameter of the casing while the feed shaft is rotating, the screw housing bore is reduced to the screw diameter before any further pickup of the molten plastic band. This is achieved preferably with an inserted stripper bar. The stripper bar can also be made with a reduced gap between it and the screw lands.

For the performance of these operations the apparatus consists of a plastic melting extruder and a plasticizing extruder, and it is furthermore characterized according to one embodiment by the fact that, for the introduction of endless fiber fleeces or fiber mats of natural, chemical, glass, mineral, carbon, chopped or metal fibers into the plasticizing extruder, the infeed opening is parallel to the extruder axes and is in slot form over the feed shaft, the feed slot length being made with approximately the width b of the fiber fleece or fiber mats, the diameters D, increased by 2 to 20 mm and preferably disposed eccentrically, of the housing bores are again provided, after the wrap-arounds, with the otherwise common diameter d, or strippers are disposed on the tandem shaft and/or on the feed shaft following the wrap-arounds.

In another embodiment of the present invention, the method is further characterized in that the weight per unit area or the weight per meter of the fiber fleece or both weights is continuously weighed before entry in the plasticizing extruder and the percentage fiber content by weight in the fiber-reinforced plastic composition and the fiber-reinforced plastic composition weight are held within close tolerances by a rearwardly directed cascade control strategy, a forwardly directed cascade control strategy, or a rearwardly and forwardly directed cascade control strategy.

In another embodiment of the present invention, the method is further characterized in that the endless fiber fleeces are made from raw fiber bales in a fleece production apparatus and are fed therefrom directly to the plasticizing extruder.

In another embodiment of the present invention, the method is further characterized in that the ends of the fiber fleece or fiber mat are attached to an endless fiber fleece or fiber mat for feeding into the extruder with a manual or automatic spool/roll change.

In another embodiment of the present invention, the method is further characterized in that the fiber fleece is formed by spreading the fibers directly on a conveyor belt and is fed to the extruder.

In another embodiment of the present invention, the method is further characterized in that at least one of the fiber fleece and the fiber mat is dried directly within a line before being drawn into the extruder.

In another embodiment of the present invention, the method is further characterized in that at least one of the fiber fleece and fiber mat is preheated within a production line before it is drawn into the extruder.

In another embodiment of the present invention, the method is further characterized in that the fiber fleece web or the fiber mat web additionally serves as a transport web for staple fibers, long fiber granules, granules, recyclate chips or fillers.

In another embodiment of the present invention, the apparatus is further characterized in that the endless fiber fleece or the endless fiber mat is guided in the infeed opening over a rounded entry wall of the infeed slot.

In another embodiment of the present invention, the apparatus is further characterized as having a diameter reduction downstream from the infeed opening that terminates in a spiral in the direction of rotation.

In another embodiment of the present invention, the apparatus is further characterized in that a feed-slot jaw with an oscillating drive is disposed for movement on the entry end of the infeed opening.

In another embodiment of the present invention, the apparatus is further characterized in that the feed-slot jaw is thermally insulated from the housing.

In another embodiment of the present invention, the apparatus is further characterized in that the temperature of the feed-slot jaw can be reduced below the tackiness temperature of the fiber fleece.

In another embodiment of the present invention, the apparatus is further characterized in that strippers are provided in the feed-slot.

In another embodiment of the present invention, the apparatus is further characterized in that the strippers are exchangeable.

In another embodiment of the present invention, the apparatus is further characterized in that the strippers are at an interval away from screw lands which is smaller than an interval in the enlarged housing bores.

DETAILED DESCRIPTION OF THE PREFERRED EMBODIMENTS

Figure 1:
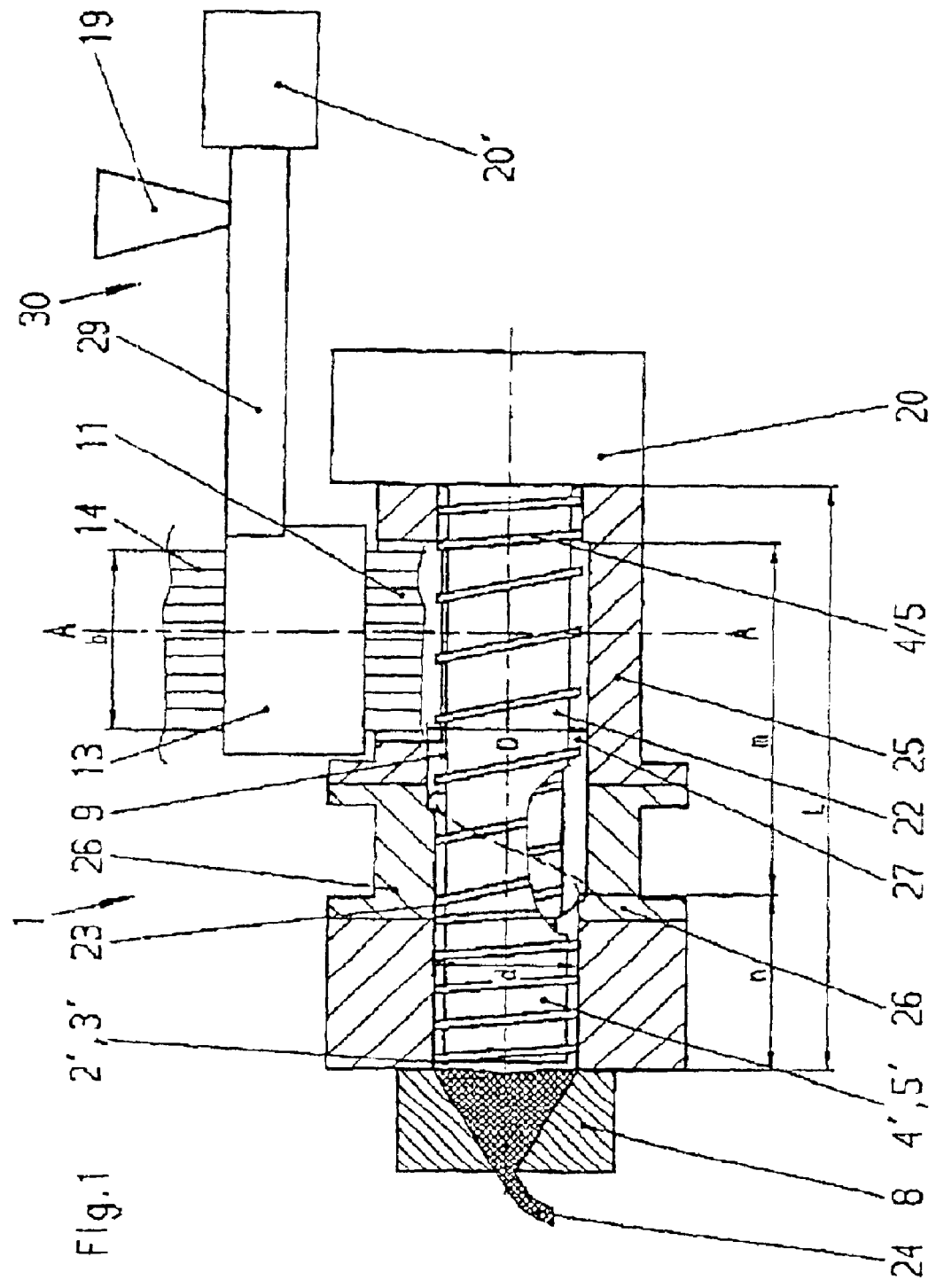
FIG. 1 shows the apparatus for the practice of the method of the invention in a side elevation and in section B—B of FIG. 2.
Figure 2:
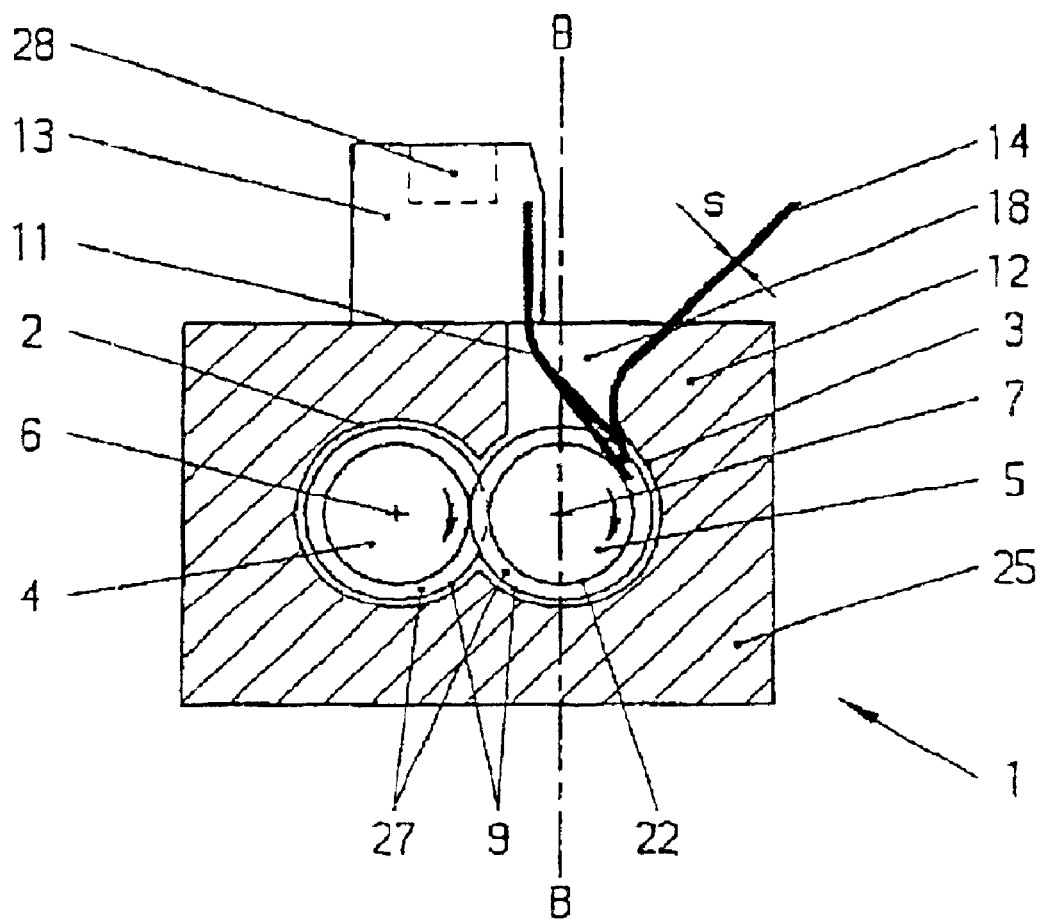
FIG. 2 depicts the apparatus according to the invention in a section A—A from FIG. 1.
Figure 3:
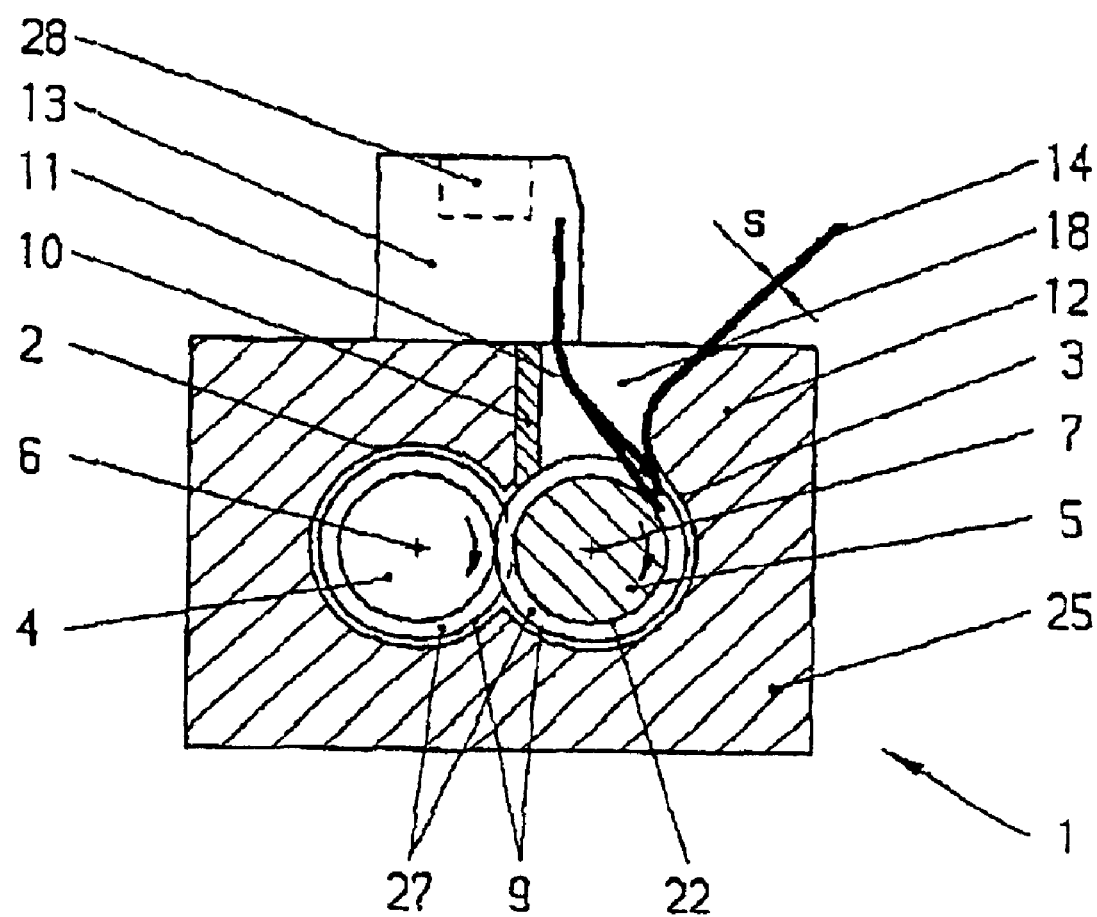
FIG. 3 depicts the apparatus according to the invention in a second embodiment.
Figure 4:
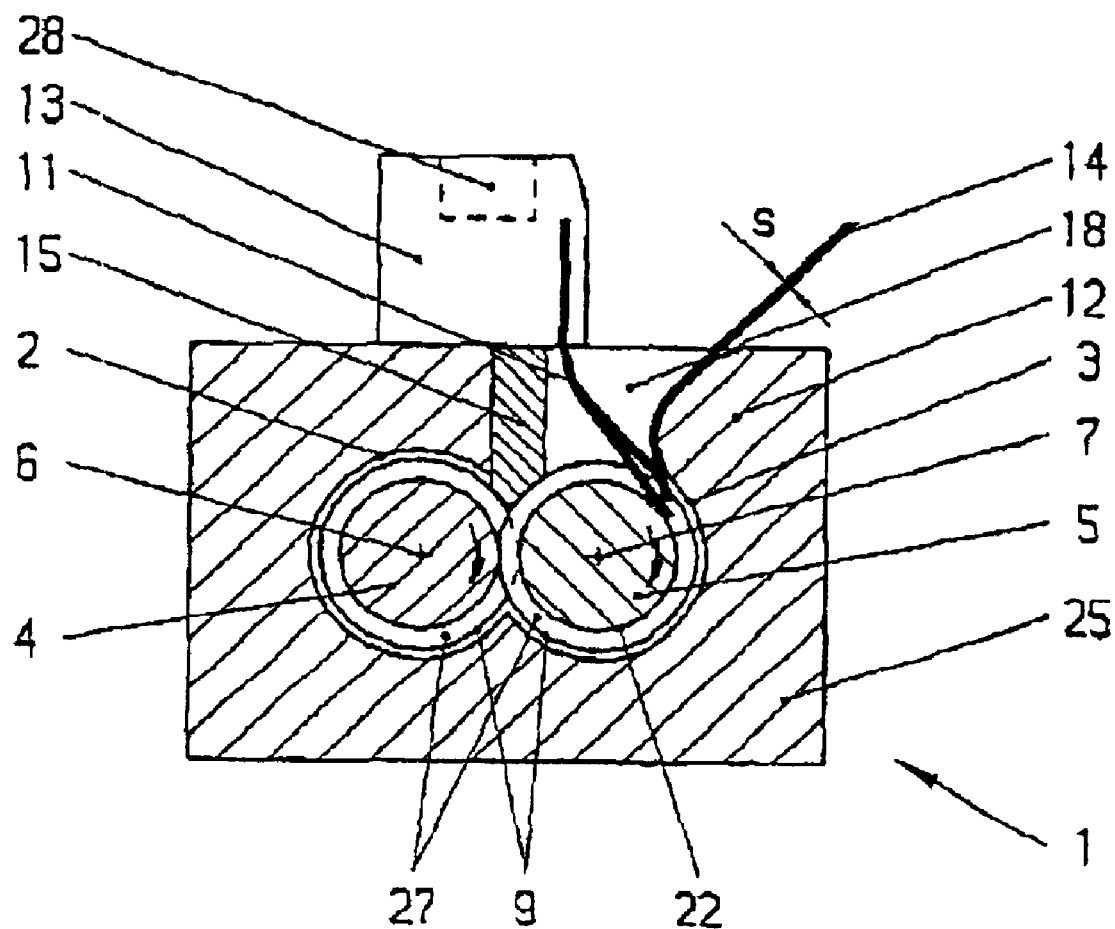
FIG. 4 depicts the apparatus according to the invention in a third embodiment.

FIG. 1 shows the apparatus which is used to practice the method of manufacturing fiber-reinforced plastic compositions. The apparatus comprises the plasticizing extruder 1 and the molten plastic extruder 30. In FIGS. 2 to 5, the plasticizing extruder 1 according to the invention is shown as a dual shaft extruder with a length L. As FIG. 1 shows, the length of the plasticizing extruder 1 is divided into two function areas and configured accordingly, namely into a feed and impregnation section m and a discharge and advancing section n. For a shaped discharge of the finished product (fiber reinforced plastic composition) 24, a discharge nozzle 8 is mounted at the end. FIG. 2, which is the section cut A—A from FIG. 1, shows how the fiber fleece or fiber mat 14 is drawn into the infeed opening 18 and the discharge nozzle 13 on the left of the infeed opening 18.

The plasticizing extruder 1 further comprises the screw casing 25 with the casing bores 2 and 3 as well as the extruder shafts 6 and 7 for the feed shaft 5 and the tandem shaft 4 in the feed and impregnation section m, the screw casing 26 with the bores 2' and 3' for the extruder shafts 4' and 5'of the discharge and advancing section n.

FIG. 1 shows the plastic melting extruder 30, which prepares the plastic from the hopper 19 for feeding the plastic granules, as well as the plastic transfer means 29, and a motor 20'. The plastic transfer means 29 advances the prepared plastic film 11 through the plastic feeder 28 into the discharge nozzle 13. The motor 20 serves to drive the extruder shafts 4/5 and 4'/5'. During production, the fiber fleece 14 is advanced into the feed channel 27, and from there it is drawn in the direction of the discharge by the screws of the plasticizing extruder 1 by means of the advantageously rounded screw lands 9 and the rounded screw channel 22. At the same time the fiber fleece 14 also moves onto the screw lands back and forth between the outside diameter and the core diameter, and is transferred in the parallel dual screw extruder 1 from the feed shaft 5 to the tandem shaft 4 and vice versa. That is to say, the fiber fleece 14 is carried in a kind of circulation, more or less overlapping depending on the fiber web width b, toward the discharge nozzle 8. During these sliding transport movements, the fluid plastic film 11 accompanying the fiber fleece 14 is worked into the fiber fleece 14 and the individual fibers.

As can be seen from FIGS. 1 and 2, the fiber fleece 14 in the first embodiment is drawn into the entry slot of the infeed opening 18 of the plasticizing extruder 1 with its width b parallel to the extruder shafts 5 and 7 and approximately tangential to the feed shaft 5 and the tandem shaft 4 and it is wound in loops around the tandem shaft 4 in an advancing and overlapping manner, and through casing bores 2 and 3, which are enlarged by 2 to 20 mm from diameter D and eccentrically disposed. In the infeed opening 18, a fluid plastic film 11 is applied directly onto one flat side of the fiber fleece 14 by pressing the fiber fleece band into the fluid plastic film 11, which is applied from the left discharge nozzle 13 onto the feed shaft 5. Within the feed and impregnation section m, the fiber fleece 14 is wetted and impregnated on both sides with the fluid plastic film 1. The individual fibers of the fleece 14 impregnated or imbibed with the plastic film 11 then pass from the feed and impregnation section m into the discharge and transport section n.

In the case where the fiber strands are easy to impregnate and where the molten plastic has an appropriate consistency, it may suffice, according to a second and third embodiment, to introduce the fiber fleece 14 in single wraps around the feed shaft and around the tandem shaft 4 with an enlarged diameter D in the casing bores 2 and 3. In a second embodiment, the fiber fleece 14 is forced by a stripper 10 into the grooves and onto the screw lands 23 of the feed shaft 5. In a third embodiment, the fiber fleece 14 is forced into the grooves and lands 23 of the feed and tandem shafts 5 and 4 by a stripper.

As can be seen from the Figures, the fiber fleece 14 is carried into the infeed openings 18 across an approximately rounded entry wall 12 onto the feed shaft 5. However, it is envisioned that other smooth surfaces of varying geometry will suffice. It is further envisioned that a roller can be substituted for the rounded entry wall 12.

Figure 5:
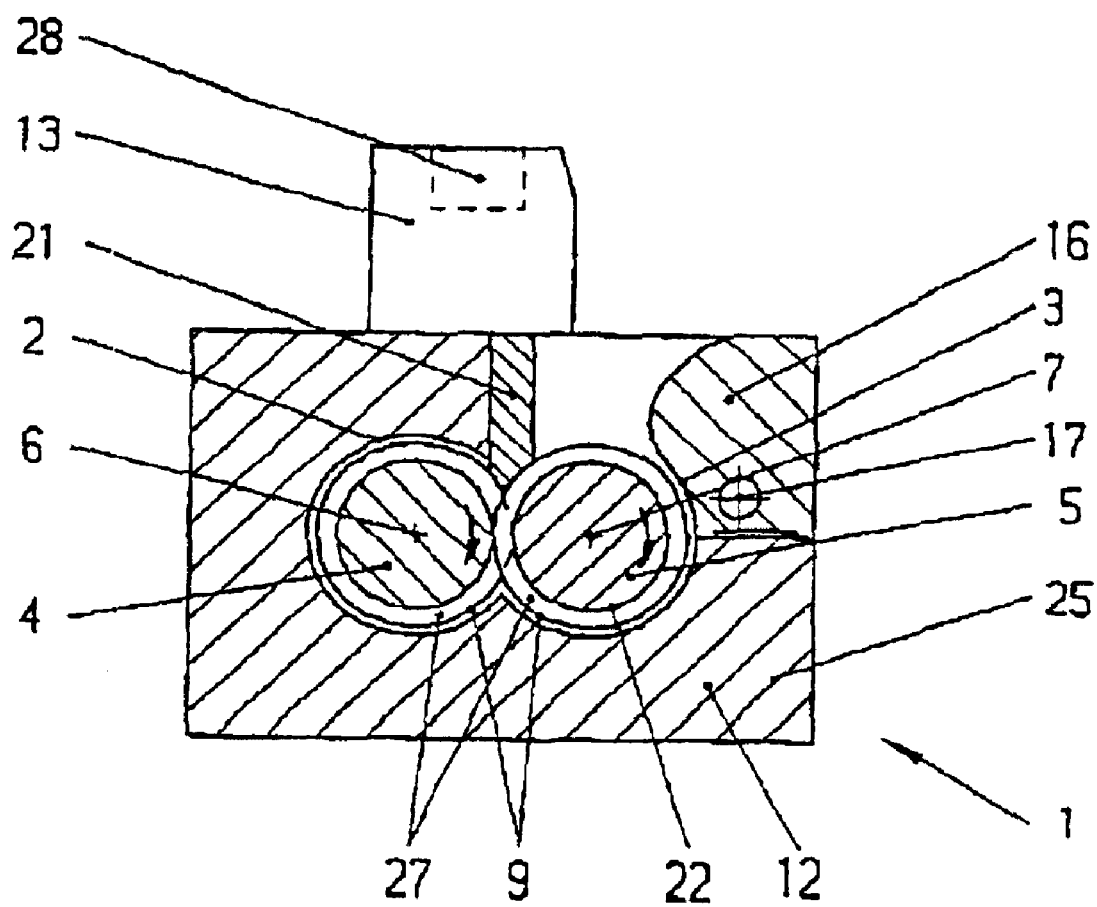
FIG. 5 depicts the apparatus according to the third embodiment with a feed-slot jaw.

FIG. 5 shows additional embodiments of the present invention, which may be considered improvements with regard to trouble-free guidance in the infeed opening 18 for the fiber fleece 14, as well as improvements with regard to cleaning this area. FIG. 5 illustrates providing a removable and replaceable or engageable and disengageable feed-slot jaw instead of the entry wall 12. In this embodiment, this feed-slot jaw 16 is optionally thermally insulated from the screw casing 25 and, being heated or cooled by means of a bore 17, is adjustable to a temperature which is slightly lower than the tackiness temperature of the fiber fleece, although it is envisioned that this option can be practiced independently of the removable and replaceable or engageable and disengageable feed-slot jaw. It is furthermore envisioned that equipping the feed-slot jaw 16 with an oscillating drive will yield advantageous results. In an additional embodiment the strippers 10 and 15 are in the form of replaceable strippers 21. It is further envisioned that in the use of fiber fleece 14 consisting of pieces of fiber, advantageous results will be obtained if the diameter reduction d following the infeed opening 18 is of spiral shape, ending in the direction of rotation.

In another embodiment, there is a method for the manufacture of fiber-reinforced plastic compositions using a plasticizing extruder, in which an endless fiber strand is passed through a feeding device and a preheating device into the infeed opening of the plasticizing extruder with its width parallel to the extruder shafts and advancingly wound approximately tangentially around the extruder shafts and drawn into cylinder bores of screw cylinders enlarged in diameter, while the application of a fluid plastic film onto the extruder shaft and lands takes place in the infeed opening and the pressing of the fiber strand into the plastic film, then the fiber strand with the individual fibers is wetted or impregnated on all sides with the fluid plastic film on the extruder shafts within a feed and impregnation section, and the individual fibers or fiber strand thoroughly impregnated or imbibed with plastic are carried from the feed-slot and impregnation section over a screw cylinder of reduced diameter into a discharge and advancing section, and discharged as a further processable, fiber-reinforced plastic composition (plasticate), characterized in that endless fiber fleeces or fiber mats of natural, chemical, glass, mineral, carbon, chopped or metal fibers and their possible combinations, approximately having the width b of the feed slot length, are fed to the slot-like infeed opening of the plasticizing extruder with the fluid plastic, and that the fiber fleeces or fiber mats, after looping around in the enlarged area of the screw cylinder are introduced into the grooves and onto the lands of the feed shaft.

In another embodiment, there is a method for the manufacture of fiber-reinforced plastic compositions by the use of a plasticizing extruder, characterized in that endless fiber fleeces or fiber mats of natural, chemical, glass, mineral, carbon, chopped or metal fibers and their possible combinations are fed together with the fluid plastic, and in the form of a web with the width b of the feed slot length into a feed slot in the plasticizing extruder, and that the fiber fleeces or fiber mats, after looping around in the enlarged area of the screw cylinder, are forced by strippers into the grooves and onto the lands of the feed shaft.

In yet another embodiment, there is a method for the manufacture of fiber-reinforced plastic compositions by the use of a plasticizing extruder, characterized in that endless fiber fleeces or fiber mats of natural, chemical, glass, mineral, carbon, chopped or metal fibers and their possible combinations, in the form of a web with the width b of the feed slot length are fed to a feed slot of the plasticizing extruder together with the fluid plastic, and that the fiber fleeces or fiber mats, after looping around in the enlarged section of the screw cylinder, are forced by strippers into the grooves and onto the lands of the feed shaft and of the tandem shaft.

In yet another embodiment, there is an apparatus for the manufacture of fiber-reinforced plastic compositions, comprising a plastic fusion extruder and a plasticizing extruder with a heating device heating the endless fiber strand in the transport web [running] to the plasticizing extruder, an impregnation device in the plasticizing extruder for the introduction of the fiber strand, the plasticizing extruder consisting of a housing with two bores and axes of two extruder shafts driven in rotation, an infeed opening being provided in the housing for introducing a fiber strand into the screw bores, the plasticizing extruder length is divided into a feed and impregnation section, the housing for the feed and impregnation section m being formed with cylinder bores enlarged in diameter, a discharge nozzle being placed over the infeed opening, the infeed opening being provided with its length preferably parallel to the axes approximately tangentially over an extruder shaft and in the discharge and transport section the cylinder bores are made with the otherwise usual diameter, for the practice of the methods, characterized in that, for the introduction of endless fiber fleeces or fiber mats (14) of natural, chemical, glass, mineral, carbon, chopped or metal fibers in web form into the plasticizing extruder (1), the infeed opening (18) is arranged parallel to the extruder axes (6, 7) and in slot form above the feed shaft (5), the entrance slot length being made with approximately the width (b) of the fiber fleece or the fiber mats (14), the diameter (D) of the housing bores (2, 3) enlarged by 2 to 20 mm and preferably arranged eccentrically, are provided again after wrap-arounds with the otherwise usual diameter (d) or, after wrap-arounds, strippers (10/15) are arranged on the tandem shaft and/or on the feed shaft (4, 5).

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The priority document here, German Patent Application No. DE 1 00 59 461.1, filed Nov. 30, 2000, including the specification, the drawings, the claims, and the abstract, upon which this application is based, is incorporated herein by reference in its entirety. Additionally, U.S. patent application, Ser. No. 09/997,253 (claiming priority from German Patent Application No. DE 100 59 525.1, filed Nov. 30, 2000), including the specification, the drawings, the claims, and the abstract, is incorporated herein by reference in its entirety.

What is claimed is:

1. An apparatus for the manufacture of fiber-reinforced plastic compositions, comprising:
   a plastic fusion extruder; and
   a plasticizing extruder, including
      a housing with two bores of varying diameter and two extruder shafts driven in rotation, one of the extruder shafts being a feed shaft,
      a discharge and transport section in the housing,
      a feed and impregnation section in the housing, including a slot-like infeed opening provided in the housing above the feed shaft for the introduction of endless fiber fleeces or fiber mats into at least one of the bores, wherein the infeed opening has a slot length of approximately the width of the fiber fleece or fiber mat and is parallel to the extruder shafts and is approximately tangental to one of the extruder shafts, and wherein the bores have wrap-arounds enlarged by 2–20 mm with respect to a diameter of the bores in the discharge and transport section, and
      a discharge nozzle placed over the infeed opening
   wherein strippers are arranged on at least one of the extruder shafts.

2. The apparatus of claim 1, wherein strippers are arranged on the feed shaft.
3. The apparatus of claim 1, wherein strippers are arranged on both extruder shafts.
4. The apparatus of claim 1, wherein the endless fiber fleece or fiber mat is guided in the infeed opening over a rounded entry wall.
5. The apparatus of claim 1, wherein the plasticizing extruder has a diameter reduction downstream from the infeed opening that terminates in a spiral in the direction of rotation.
6. The apparatus of claim 1, wherein a moveable feed-slot jaw is disposed on the infeed opening.
7. The apparatus of claim 6, wherein an oscillating drive is disposed with the feed-slot jaw.
8. The apparatus of claim 6, wherein the feed-slot jaw is thermally insulated from the housing.
9. The apparatus of claim 6, wherein the apparatus is adapted to reduce the temperature of the feed-slot jaw below the tackiness temperature of the endless fiber fleece or fiber mat.
10. The apparatus of claim 1, wherein strippers are provided in the infeed opening.
11. The apparatus of claim 10, wherein the strippers are exchangeable.
12. The apparatus of claim 10, wherein the distance between the strippers and the shafts is smaller than the distance between the enlarged housing bores and the shafts.
13. The apparatus of claim 1, further comprising a heater adapted to heat the endless fiber fleece or fiber mat running to the plasticizing extruder.
14. An apparatus for the manufacture of fiber-reinforced plastic compositions, comprising:
   a plastic fusion extruder; and
   a plasticizing extruder, including
      a housing with two bores of varying diameter and two extruder shafts driven in rotation, one of the extruder shafts being a feed shaft,
      a discharge and transport section in the housing,
      a feed and impregnation section in the housing, including a slot-like infeed opening provided in the housing above the feed shaft for the introduction of endless fiber fleeces or fiber mats into at least one of the bores, wherein the infeed opening has a slot length of approximately the width of the fiber fleece or fiber mat and is parallel to the extruder shafts and is approximately tangental to one of the extruder shafts, and wherein the bores have wrap-arounds enlarged by 2–20 mm with respect to a diameter of the bores in the discharge and transport section, and
      a discharge nozzle placed over the infeed opening;
   wherein the plasticizing extruder has a diameter reduction downstream from the infeed opening that terminates in a spiral in the direction of rotation.

15. An apparatus for the manufacture of fiber-reinforced plastic compositions, comprising:
   a plastic fusion extruder; and
   a plasticizing extruder, including
      a housing with two bores of varying diameter and two extruder shafts driven in rotation, one of the extruder shafts being a feed shaft,
      a discharge and transport section in the housing,
      a feed and impregnation section in the housing, including a slot-like infeed opening provided in the housing above the feed shaft for the introduction of endless fiber fleeces or fiber mats into at least one of the bores, wherein the infeed opening has a slot length of approximately the width of the fiber fleece or fiber mat and is parallel to the extruder shafts and is approximately tangental to one of the extruder shafts, and wherein the bores have wrap-arounds enlarged by 2–20 mm with respect to a diameter of the bores in the discharge and transport section, and a discharge nozzle placed over the infeed opening;

wherein a moveable feed-slot jaw is disposed on the infeed opening.

16. The apparatus of claim 15 wherein an oscillating drive is disposed with the feed-slot jaw.

17. The apparatus of claim 15, wherein the feed-slot jaw is thermally insulated from the housing.

18. The apparatus of claim 15, wherein the apparatus is adapted to reduce the temperature of the feed-slot jaw below the tackiness temperature of the endless fiber fleece or fiber mat.

19. An apparatus for the manufacture of fiber-reinforced plastic compositions, comprising:

a plastic fusion extruder; and a plasticizing extruder, including a housing with two bores of varying diameter and two extruder shafts driven in rotation, one of the extruder shafts being a feed shaft, a discharge and transport section in the housing, a feed and impregnation section in the housing, including a slot-like infeed opening provided in the housing above the feed shaft for the introduction of endless fiber fleeces or fiber mats into at least one of the bores, wherein the infeed opening has a slot length of approximately the width of the fiber fleece or fiber mat and is parallel to the extruder shafts and is approximately tangental to one of the extruder shafts, and wherein the bores have wrap-arounds enlarged by 2–20 mm with respect to a diameter of the bores in the discharge and transport section, and a discharge nozzle placed over the infeed opening;

wherein strippers are provided in the infeed opening.

20. The apparatus of claim 19, wherein the strippers are exchangeable.

21. The apparatus of claim 19, wherein the distance between the strippers and the shafts is smaller than the distance between the enlarged housing bores and the shafts.

\* \* \* \* \*